US012397360B2

(12) United States Patent
Torres

(10) Patent No.: US 12,397,360 B2
(45) Date of Patent: Aug. 26, 2025

(54) BRAZING PROBE

(71) Applicant: Carrier Corporation, Palm Beach Gardens, FL (US)

(72) Inventor: Gustavo Torres, Bartlett, TN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 13 days.

(21) Appl. No.: 18/345,171

(22) Filed: Jun. 30, 2023

(65) Prior Publication Data
US 2024/0009746 A1 Jan. 11, 2024

Related U.S. Application Data

(60) Provisional application No. 63/358,308, filed on Jul. 5, 2022.

(51) Int. Cl.
*B23K 1/00* (2006.01)
*B23K 3/00* (2006.01)
*B23K 3/02* (2006.01)
*B23K 3/04* (2006.01)
*B23K 3/08* (2006.01)
*B23K 101/14* (2006.01)

(52) U.S. Cl.
CPC ............ *B23K 1/0012* (2013.01); *B23K 3/025* (2013.01); *B23K 3/043* (2013.01); *B23K 3/085* (2013.01); *B23K 2101/14* (2018.08)

(58) Field of Classification Search
CPC ...... B23K 1/0012; B23K 3/025; B23K 3/043; B23K 3/085; B23K 2101/14; B23K 1/0004; B23K 1/002; B23K 3/0471; B23K 3/0475; B23K 2103/10; B23K 3/08; B23K 1/00–206; B23K 3/00–087

USPC ........ 228/102–105, 183, 8–12; 219/59.1–67, 219/606–616
See application file for complete search history.

(56) References Cited

U.S. PATENT DOCUMENTS

| 3,605,255 | A |   | 9/1971 | Metzger et al. |
|---|---|---|---|---|
| 4,645,119 | A |   | 2/1987 | Haramaki et al. |
| 4,659,896 | A | * | 4/1987 | Krasicki .................. H05B 6/38 219/85.13 |
| 4,769,919 | A |   | 9/1988 | Lloyd et al. |
| 5,098,006 | A |   | 3/1992 | McManus |
| 5,125,555 | A |   | 6/1992 | Grisoni et al. |
| 5,234,151 | A |   | 8/1993 | Spigarelli |

(Continued)

FOREIGN PATENT DOCUMENTS

| CN | 106735664 A | * | 5/2017 | ............. B23K 1/002 |
|---|---|---|---|---|
| CN | 104923880 B |   | 9/2017 |   |

(Continued)

*Primary Examiner* — Kiley S Stoner
(74) *Attorney, Agent, or Firm* — CANTOR COLBURN LLP

(57) ABSTRACT

A brazing apparatus to join a first component and a second component includes a heating element configured to melt a ring located at a joint between the first component and the second component, and a probe configured to contact the ring. A position of the probe is biased toward the ring. The probe is installed at a probe support. The probe is movable along a probe central axis relative to the probe support. A sensor is operably connected to the probe and is configured to determine movement of the probe along the probe central axis. The movement of the probe is indicative of melting of the ring.

17 Claims, 5 Drawing Sheets

(56) References Cited

U.S. PATENT DOCUMENTS

| | | |
|---|---|---|
| 8,074,356 B2 | 12/2011 | Branyon et al. |
| 8,444,041 B2 | 5/2013 | Perry |
| 8,960,522 B2 | 2/2015 | Taras et al. |
| 9,919,374 B2 | 3/2018 | Wu et al. |
| 10,486,262 B2 | 11/2019 | Avila |
| 2021/0354223 A1 | 11/2021 | Seiwert et al. |
| 2021/0354224 A1 | 11/2021 | Seiwert et al. |
| 2024/0044939 A1 * | 2/2024 | Wu ................... G01R 1/06722 |

FOREIGN PATENT DOCUMENTS

| | | | |
|---|---|---|---|
| CN | 110933935 A * | 3/2020 | ........... B23K 1/0016 |
| CN | 111347122 A | 6/2020 | |
| CN | 210848694 U | 6/2020 | |
| CN | 211904434 U * | 11/2020 | |
| CN | 212869844 U * | 4/2021 | |
| CN | 114088815 A * | 2/2022 | |
| FR | 2579917 A1 * | 11/1986 | |
| FR | 3050020 A1 * | 10/2017 | ........... B23K 1/0012 |
| JP | 3842081 B2 | 8/2006 | |
| JP | 2010172943 A | 8/2010 | |
| KR | 101043603 B1 | 6/2011 | |

\* cited by examiner

BRAZING PROBE

CROSS-REFERENCE TO RELATED APPLICATIONS

This application claims the benefit of U.S. Provisional Application No. 63/358,308 filed Jul. 5, 2022, the disclosure of which is incorporated by reference in its entirety.

BACKGROUND

Exemplary embodiments pertain to the art of aluminum brazing, and more specifically to an aluminum brazing apparatus and probes suitable for manufacturing a heat exchanger.

Brazing is a metal-joining process with many applications, such as the joining of tubes for heat exchangers. In the joining of aluminum heat exchanger tubes, a brazing torch is used to melt an alloy ring at the joint between a first tube and a second tube. The process has a small temperature window, such that if the torch is held at the alloy ring for too long a time the tubes may be damaged due to overexposure to the heat from the torch. Typically, the time the torch is held at the braze joint is based on a visual assessment by the operator of the torch. Reliance on the visual assessment can lead to inconsistent braze joints and damaged tubes.

BRIEF DESCRIPTION

In one embodiment, a brazing apparatus to join a first component and a second component includes a heating element configured to melt a ring located at a joint between the first component and the second component, and a probe configured to contact the ring. A position of the probe is biased toward the ring. The probe is installed at a probe support. The probe is movable along a probe central axis relative to the probe support. A sensor is operably connected to the probe and is configured to determine movement of the probe along the probe central axis. The movement of the probe is indicative of melting of the ring.

Additionally or alternatively, in this or other embodiments a compression spring is operably connected to the probe to bias the position of the probe toward the ring.

Additionally or alternatively, in this or other embodiments the compression spring is secured at an exterior surface of the probe.

Additionally or alternatively, in this or other embodiments the heating element is one of a torch, a resistive heating element or an inductive heating element.

Additionally or alternatively, in this or other embodiments the probe includes one or more cooling channels having a cooling fluid circulating therethrough.

Additionally or alternatively, in this or other embodiments the cooling fluid is one of air or oil.

Additionally or alternatively, in this or other embodiments the probe includes and cooling fluid inlet and a cooling fluid outlet connected to the one or more cooling channels to circulate the cooling fluid through the one or more cooling channels.

Additionally or alternatively, in this or other embodiments a controller is operably connected to the sensor and to the heating element. The controller is configured to stop operation of the heating element when the sensor detects movement of the probe along the probe central axis.

Additionally or alternatively, in this or other embodiments the probe is formed from a metallic material.

Additionally or alternatively, in this or other embodiments the probe is formed by an additive manufacturing process.

In another embodiment, a method of brazing a tube includes positioning a probe in contact with a ring positioned at a joint between a first tube portion and a second tube portion. The probe is biased toward the ring. A heating element is positioned at the joint, and the ring is melted via operation of the heating element. Movement of the probe along a probe central axis is detected via a sensor operably connected to the probe, the movement of the probe indicative of melting of the ring.

Additionally or alternatively, in this or other embodiments the probe is biased toward the ring via a compression spring operably connected to the probe.

Additionally or alternatively, in this or other embodiments the heating element is one of a torch, a resistive heating element or an inductive heating element.

Additionally or alternatively, in this or other embodiments a cooling fluid is circulated through one or more cooling channels of the probe to cool the probe.

Additionally or alternatively, in this or other embodiments the cooling fluid is one of air or oil.

Additionally or alternatively, in this or other embodiments operation of the heating element is stopped when the sensor detects movement of the probe along the probe central axis.

Additionally or alternatively, in this or other embodiments the probe is formed from a metallic material.

Additionally or alternatively, in this or other embodiments at least one of the first tube portion and the second tube portion are formed from aluminum.

Additionally or alternatively, in this or other embodiments the first tube portion and the second tube portions are tubes of a heat exchanger.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
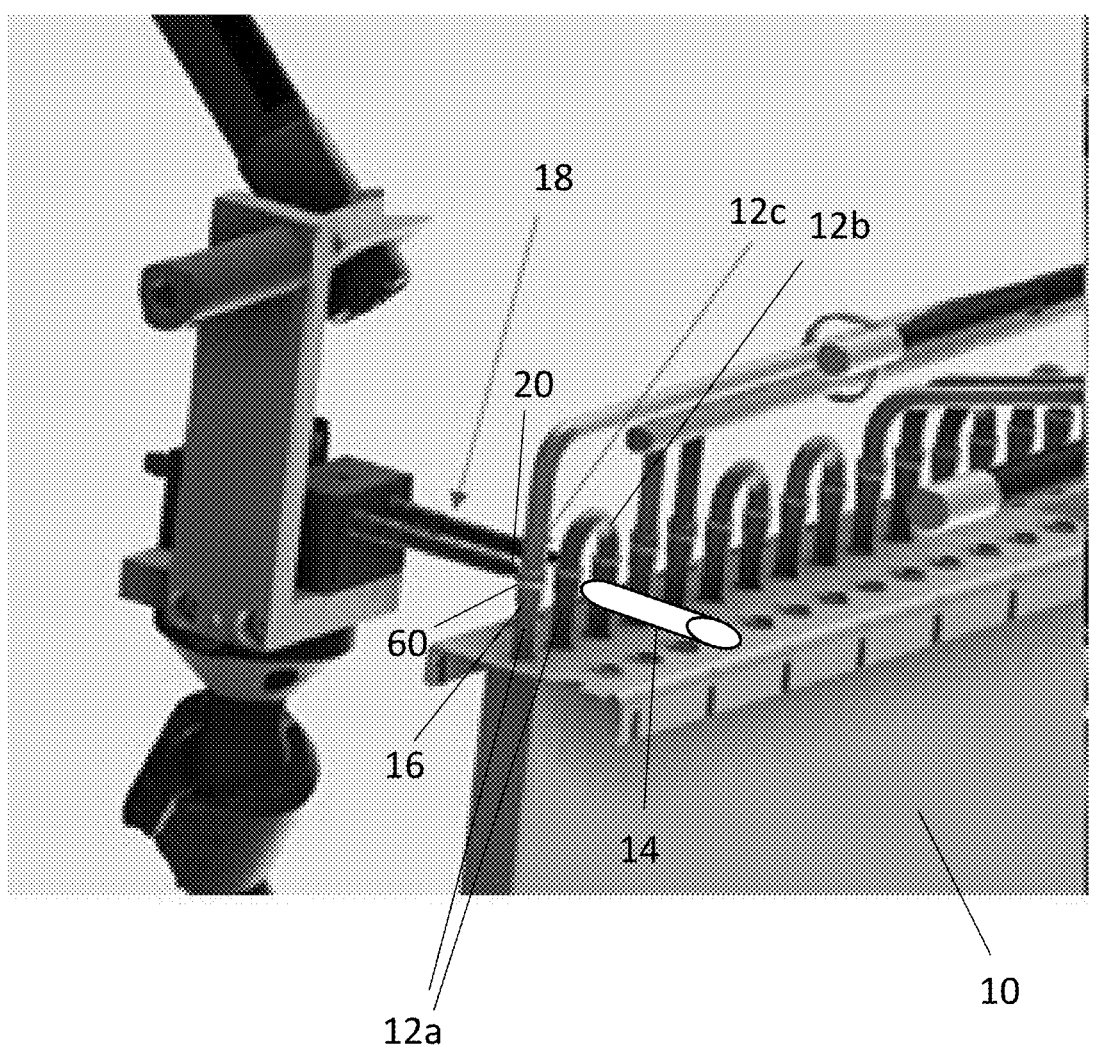
FIG. 1 is an illustration of a brazing apparatus being used for the manufacture of a heat exchanger in accordance with exemplary embodiments.

Referring to FIG. 1, illustrated is an embodiment of a brazing apparatus 100 being used for the manufacture of a heat exchanger 10. The heat exchanger 10 includes a plurality of tubes 12 through which a thermal energy exchange fluid, for example, refrigerant, is flowed. In some embodiments, the tubes 12 are formed from an aluminum material, while in other embodiments other metal materials may be utilized. The tubes 12 may include heat exchange tubes 12*a*, hairpin tubes 12*b*, header tubes 12*c*, and other tubes. Connections of tubes, for example, heat exchange tubes 12*a* to hairpin tubes 12b, is accomplished via a brazing process using a brazing apparatus 100. The brazing apparatus 100 includes a heating element, such as a torch 14 to emit heat to melt an alloy ring 16 at a joint 60 between the heat exchange tube 12a and the hairpin tube 12b. While in the embodiments described herein, the heating element is the torch 14, in other embodiments other heating elements, such as resistive or inductive heating elements may be utilized to melt the alloy ring 16. Once the alloy ring 16 is melted, the torch 14 is withdrawn to allow the alloy ring 16 to re-solidify thus joining the heat exchange tube 12a to the hairpin tube 12b. A probe 18 is placed in contact with the alloy ring 16, and is utilized to detect melting of the alloy ring 16. A signal is then provided to the operator of the torch 14, that the torch 14 may be withdrawn from the alloy ring 16. It should be appreciated that, in certain instances the signal my enable the automatic withdrawing of the torch 14 from the alloy ring 16 (i.e., without operator intervention).

Figure 2:
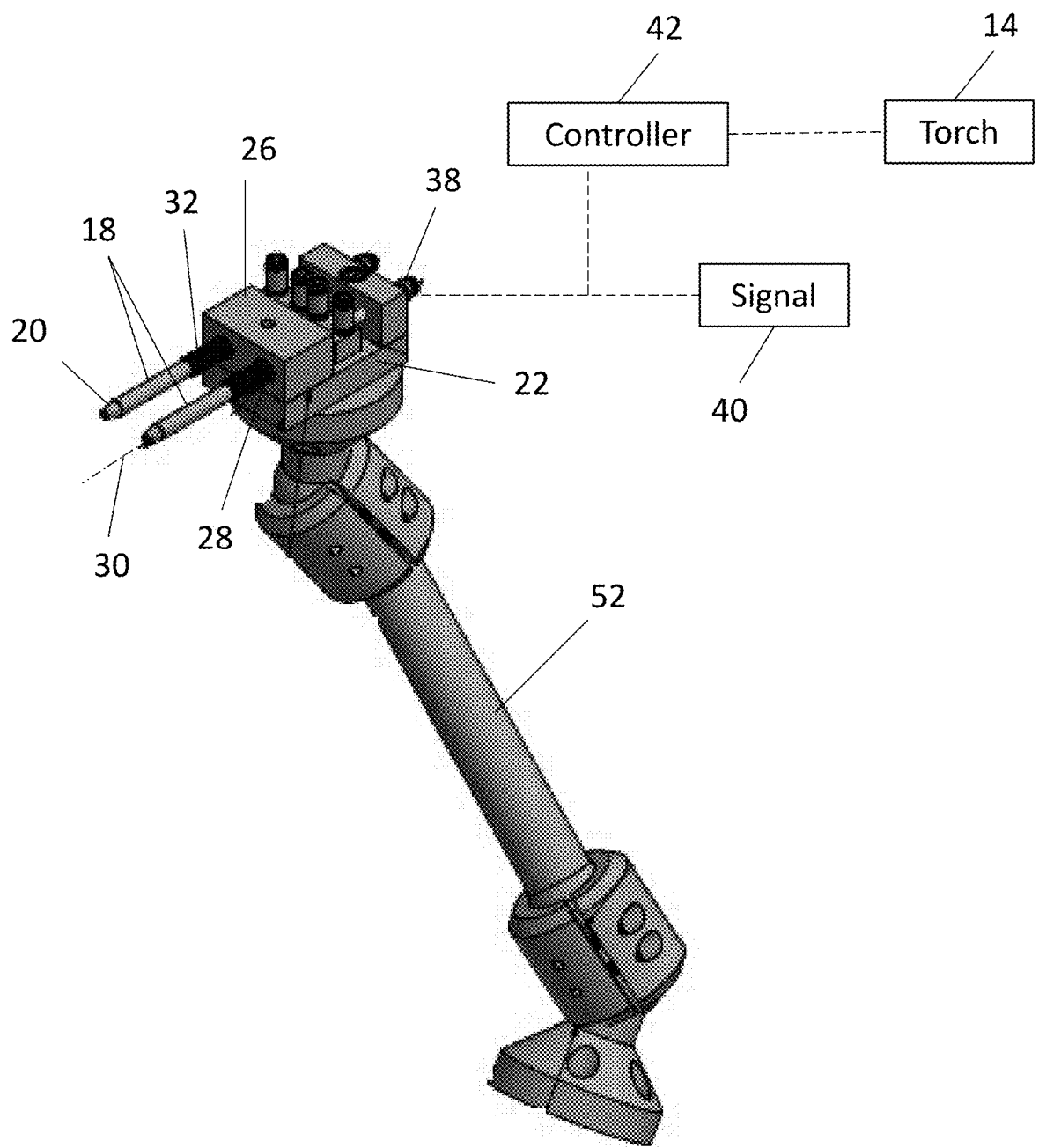
FIG. 2 is an illustration of a brazing probe in accordance with exemplary embodiments.
Figure 3:
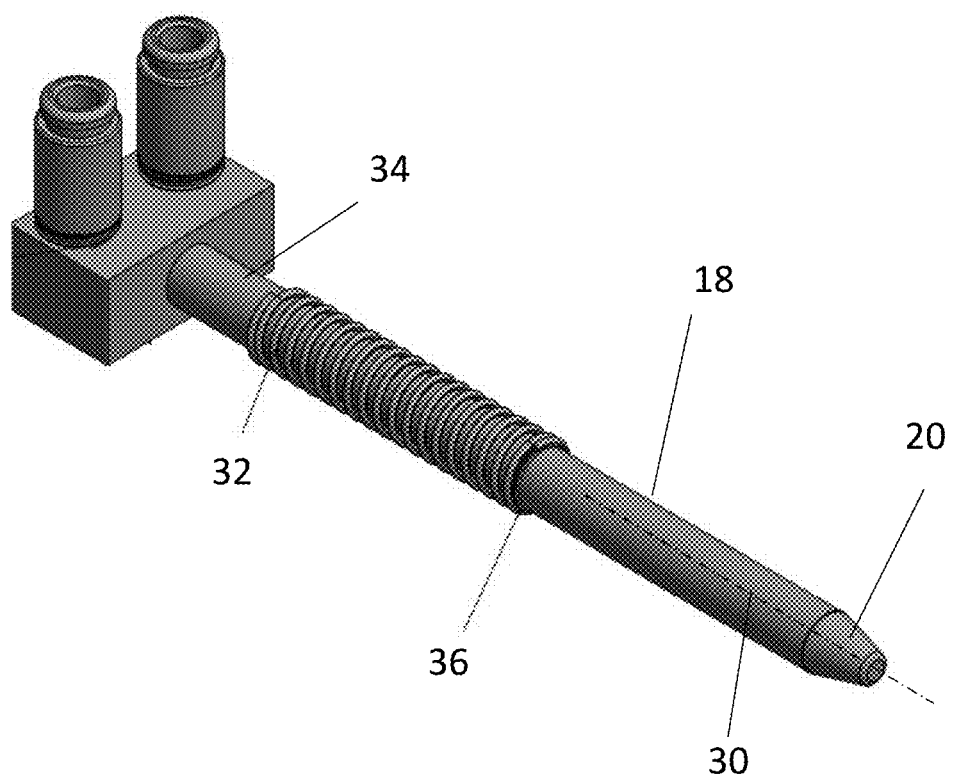
FIG. 3 is a perspective view of a brazing probe in accordance with exemplary embodiments.

Referring now to FIGS. 2 and 3, the probe 18 of the brazing apparatus 100 will now be described in more detail. The probe 18 includes a probe tip 20, which contacts the alloy ring 16, as shown in FIG. 1. The probe 18 is mounted on a probe support 22 and extends through a probe sleeve 26. In particular, the probe sleeve 26 has a sleeve opening 28 through which the probe 18 extends. The probe 18 is movable along a probe central axis 30 relative to the probe sleeve 26, and is biased toward the alloy ring 16 by a compression spring 32 mounted on a probe exterior 34 of the probe 18 and retained to the probe 18 by, for example a retaining ring 36. One skilled in the art will readily appreciate that the compression spring 32 may be retained at the probe exterior 34 by other means, such as a screw or the like.

As stated, the probe 18 contacts and is biased toward the alloy ring 16 by the compression spring 32. As the torch 14 applies heat to the alloy ring 16, the alloy ring 16 melts and softens. This allows for movement of the probe 18 along the probe central axis 30 as driven by the compression spring 32. A linear displacement sensor 38 is operably connected to the probe 18. The linear displacement sensor 38 detects the movement of the probe 18 along the probe central axis 30 when the alloy ring 16 begins to melt, and is connected to an alarm or signal mechanism 40, such as a light or sound, which alerts the operator of the torch 14 that the alloy ring 16 has melted, and that the operator should withdraw the torch 14 from the alloy ring 16 (as mentioned above, this withdraw of the torch 14 may be automated, removing the need for operator intervention). In other embodiments, the linear displacement sensor 38 is connected to a controller 42. Upon receiving the signal from the linear displacement sensor 38, the controller 42 may automatically move the torch 14 away from the alloy ring 16, or alternatively may extinguish the torch 14 by stopping a flow of fuel to the torch 14. While in some embodiments one probe 18 is mounted to the probe support 22, in other embodiments as shown in FIG. 2, multiple probes 18 are independently mounted to the probe support 22, with each probe 18 having their own compression spring 32 and linear displacement sensor 38. This allows for brazing at multiple locations simultaneously.

Figure 4:
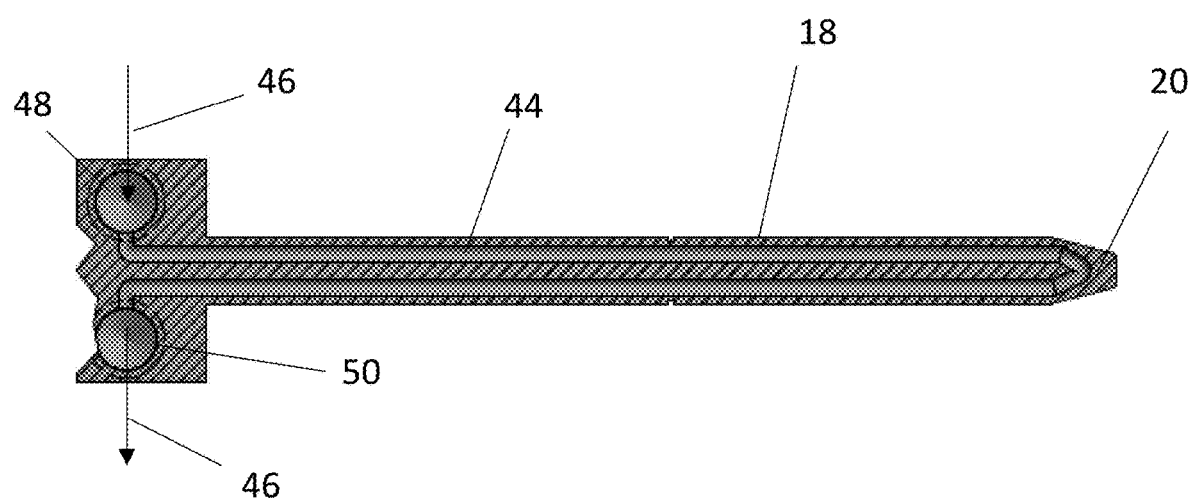
FIG. 4 is a cross-sectional view of a brazing probe in accordance with exemplary embodiments.

Referring now to FIG. 4, a cross-sectional view of an embodiments of a probe 18 is illustrated. The probe 18 is formed from, for example, a metal material. In some embodiments, the metal material is a stainless-steel material capable of operating at temperatures up to about 2550 degrees Fahrenheit. To improve the temperature tolerance of the probe 18, the probe is actively cooled by, for example, air or other cooling fluid such as oil circulated through the probe 18 via one or more cooling channels 44 formed in the probe 18. To allow for the formation of such cooling channels 44 in the probe 18, in some embodiments the probe is formed via an additive manufacturing or 3-D printing process. In some embodiments, the cooling channels 44 extend circumferentially around the probe 18, and the flow of cooling fluid 46 enters the probe 18 at a cooling inlet 48 and exits the probe 18 at a cooling outlet 50 after circulating through the cooling channels 44.

Referring again to FIG. 2, in some embodiments the probe 18 is mounted to a stand 52, such as an articulated arm. The stand 52 allows for positioning and repositioning the probe 18 as needed to point the probe 18 toward the alloy ring 16 to contact the alloy ring 16.

Figure 5:
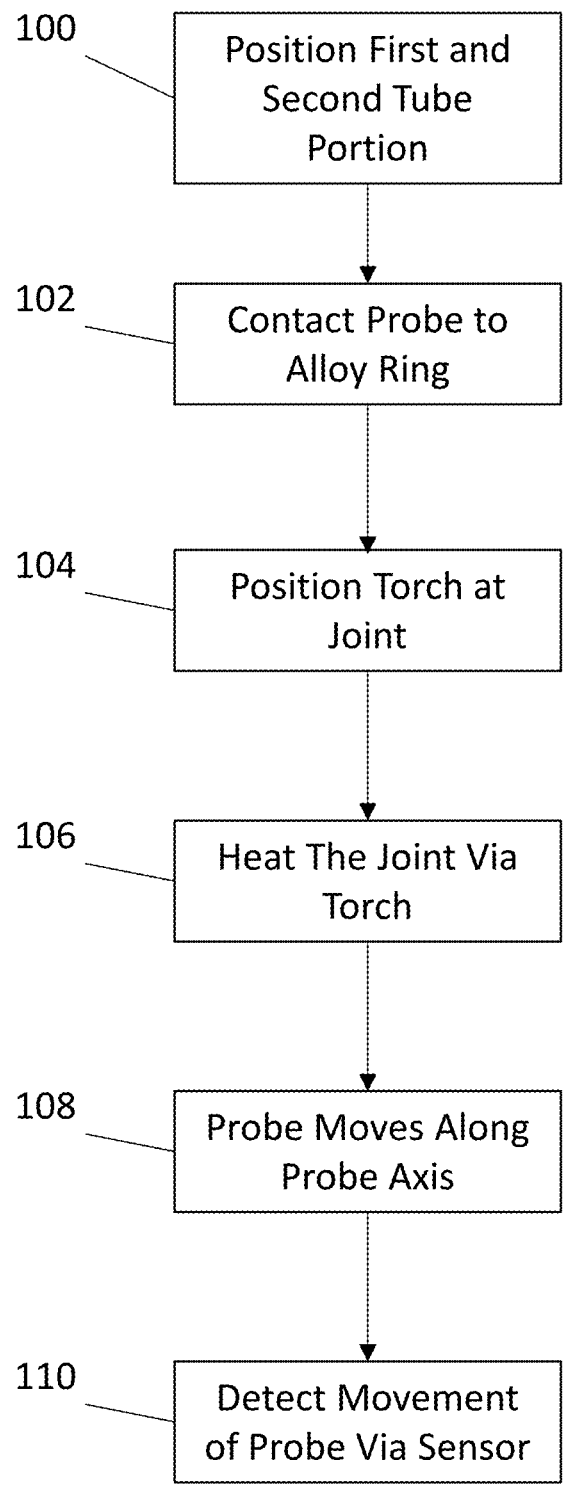
FIG. 5 is a schematic illustration of a method of brazing in accordance with exemplary embodiments.

Referring now to FIG. 5, a schematic of a method of brazing a first tube 12 to a second tube 12. In step 100, the first tube 12 and the second tube 12 are positioned and the alloy ring 16 is installed to define the joint. At step 102, the probe 18 is positioned in contact with the alloy ring 16, and the torch 14 is positioned at the alloy ring 16 and step 104. The torch 14 heats the alloy ring 16 at step 106, and the probe 18 moves along the probe central axis 30 in step 108 when the alloy ring 16 begins to melt. The movement of the probe 18 is detected by the linear displacement sensor 38 at step 110, and a signal indicates that the torch 14 should be moved to stop melting of the alloy ring 16.

Use of the probe 18 more allows for a more precise determination of when the alloy ring 16 begins to melt, and eliminates (or at least reduces) human factors from the determination. This helps optimize the brazing cycle time, and improves quality and consistency of the brazing operation, thus preventing damage to the tubes and preventing leakage at the joint.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A brazing apparatus suitable for joining a first component and a second component, the brazing apparatus comprising:

a heating element configured to melt a ring disposed at a joint between the first component and the second component; and a probe configured to contact the ring, a position of the probe biased toward the ring, a probe support at which the probe is installed, the probe movable along a probe central axis relative to the probe support;

a sensor operably connected to the probe and configured to determine movement of the probe along the probe central axis, the movement of the probe indicative of the melting of the ring; and a compression spring operably connected to the probe to bias the position of the probe toward the ring.

2. The brazing apparatus of claim 1, wherein the compression spring is secured at an exterior surface of the probe.

3. The brazing apparatus of claim 1, wherein the heating element is one of a torch, a resistive heating element, or an inductive heating element.

4. The brazing apparatus of claim 1, wherein the probe includes one or more cooling channels having a cooling fluid circulating therethrough.

5. The brazing apparatus of claim 4, wherein the cooling fluid is one of air or oil.

6. The brazing apparatus of claim 4, wherein the probe includes and cooling fluid inlet and a cooling fluid outlet connected to the one or more cooling channels to circulate the cooling fluid through the one or more cooling channels.

7. A brazing apparatus suitable for joining a first component and a second component, the brazing apparatus comprising:

a heating element configured to melt a ring disposed at a joint between the first component and the second component; and a probe configured to contact the ring, a position of the probe biased toward the ring, a probe support at which the probe is installed, the probe movable along a probe central axis relative to the probe support; and a sensor operably connected to the probe and configured to determine movement of the probe along the probe central axis, the movement of the probe indicative of the melting of the ring; and a controller operably connected to the sensor and the heating element, the controller configured to stop operation of the heating element when the sensor detects movement of the probe along the probe central axis.

8. The brazing apparatus of claim 1, wherein the probe is formed from a metallic material.

9. The brazing apparatus of claim 1, wherein the probe is formed by an additive manufacturing process.

10. A method of brazing a tube, the method comprising:

positioning a probe in contact with a ring disposed at a joint between a first tube portion and a second tube portion, the probe biased toward the ring;

positioning a heating element at the joint;

melting the ring via operation of the heating element; and detecting movement of the probe along a probe central axis via a sensor operably connected to the probe, the movement of the probe indicative of melting of the ring; and stopping operation of the heating element when the sensor detects movement of the probe along the probe central axis.

11. The method of claim 10, wherein the probe is biased toward the ring via a compression spring operably connected to the probe.

12. The method of claim 10, wherein the heating element is one of a torch, a resistive heating element or an inductive heating element.

13. The method of claim 10, further comprising circulating a cooling fluid through one or more cooling channels of the probe to cool the probe.

14. The method of claim 13, wherein the cooling fluid is one of air or oil.

15. The method of claim 10, further comprising forming the probe from a metallic material.

16. The method of claim 10, wherein at least one of the first tube portion and the second tube portion are formed from aluminum.

17. The method of claim 10, wherein the first tube portion and the second tube portions are tubes of a heat exchanger.

* * * * *